United States Patent [19]

Bathellier et al.

[11] 4,318,893

[45] Mar. 9, 1982

[54] PROCESS FOR THE SEPARATION OF AMERICIUM FROM CURIUM CONTAINED IN AN AQUEOUS NITRIC SOLUTION

[75] Inventors: André Bathellier, Sceaux; Michel Germain, Marcoussis; Claude Musikas, Villebon, all of France

[73] Assignee: Commissariat a l'Energie Atomique, Paris, France

[21] Appl. No.: 83,318

[22] Filed: Oct. 10, 1979

[30] Foreign Application Priority Data

Oct. 11, 1978 [FR] France ................. 78 29016

[51] Int. Cl.$^3$ ............................................ C01G 56/00
[52] U.S. Cl. ......................................... 423/10; 423/9; 423/250
[58] Field of Search ..................... 423/8–10, 423/250

[56] References Cited

U.S. PATENT DOCUMENTS 3,034,854  5/1962  Peppard et al. .................. 423/10
3,743,696  7/1973  Mason et al. .................... 423/10

OTHER PUBLICATIONS

Lebedev et al., "Radiokhimsya", 1976, 18(4), pp. 652–658.
Lebedev et al., Chem. Abs., 85, abs. #168839 (1976).
Myasoedov et al., Chem. Abs., 79, abs. #58201 (1973).
Seaborg, "The Transuranium Elements", Atoms For Peace Series, p. 131, Yale University Press (1958), Reading, Mass.
Weigel et al., Chem. Abs., 84, abs. #98701 (1976).
Gelman et al., "Complex Compounds of Transuranium Elements", (authorized translation), pp. 166–167, Consultants Bureau (1962), New York.

Primary Examiner—Edward A. Miller
Attorney, Agent, or Firm—Kerkam, Stowell, Kondracki & Clarke

[57] ABSTRACT

Process for the separation of americium from curium contained in an aqueous nitric solution, wherein the initial solution undergoes oxidation at ambient temperature in the presence of phosphoric acid or phosphate ions at a concentration at the most equal to 0.1 mol per liter in such a way as to pass the americium at valency VI, the thus treated solution is brought into contact with a slightly reducing organic solvent having a high affinity for americium at valency VI in such a way as to extract the americium in the organic phase, the organic phase containing the americium at valency VI is then washed, followed by the re-extraction of the americium in the organic phase by means of an aqueous solution.

9 Claims, 2 Drawing Figures

PROCESS FOR THE SEPARATION OF AMERICIUM FROM CURIUM CONTAINED IN AN AQUEOUS NITRIC SOLUTION

BACKGROUND OF THE INVENTION

The present invention relates to a process for the separation of americium from the curium contained in an aqueous nitric solution resulting more particularly from the reprocessing of irradiated fuels.

It is known that the separation of americium from curium is a very difficult operation, due to the very similar chemical properties of these two elements. Numerous processes have been tested with a view to carrying this out.

Among the processes for separating americium from curium known up to now, reference is made to the reversed phase chromatography method according to which a column containing an inert support, for example teflon is used and onto this is passed a relatively volatile solvent which acts as the extracting agent. The americium is separated from the curium contained in the solution passed into the column by ion exchange. This reversed phase chromatography process makes it possible to obtain a good separation of the americium from the curium, but is difficult to use for large-scale production purposes due to difficulties encountered during the preparation and hydraulic operation of the columns.

Another hitherto tested and tried process for the separation of americium from curium involves separation on ion exchange resin (mineral or organic exchangers). According to this method, separation is carried out by a selective elution of the americium and the curium at valency III, the quality of separation being a function of the nature of the eluent. Therefore, several different eluents have been envisaged, for example a hydrolalcoholic solution of nitric acid, an ammonium α-hydroxyisobutyrate solution, a hydroalcoholic solution of nitric acid containing ammonium nitrate and DTPA (diethylene-triaminopentaacetic acid), a hydroxy-ethyl-diaminotriacetic acid solution, etc. According to this process, the separation factor of the americium from the curium remains low and is of the order of 2 to 3. The same separation method on ion exchange resin, but under pressure makes it possible to more efficiently and rapidly separate americium from curium. However, it is difficult to perform, due to the high pressure used (pressures close to 300 atmospheres).

Another prior art process for separating americium from curium is the extraction by solvent of elements at valency III by means of amines in a salting-out medium (which consists of adding beforehand salting-out salts such as aluminium nitrate or lithium nitrate to the aqueous solution to be treated). After extraction of the elements at valency III, a selective re-extraction can be obtained with a polyaminoacetic complexing agent such as DTPA. This process has the disadvantage that the separation factors for the separation of the americium from the curium are only about 2 to 3.

Another process for separating americium from curium involves the selective precipitation of one of the constituents. The curium at valency III can be precipitated in fluoride or oxalate form in the presence of americium at valency VI or the americium can be separated by precipitation of the double americium and potassium carbonate. However, this method of precipitating one of the constituents only makes it possible to obtain very limited separation factors, so that the same operations have to be repeated several times to obtain the desired purity of one of the elements.

Consideration has also been given to the separation of americium from curium by liquid extraction by oxidizing the americium at a higher valency and then extracting it in an organophosphorus solvent constituted by di(2-ethylhexyl)-phosphoric acid. However, the results obtained are not satisfactory because it is difficult to maintain americium in the oxidized state. However, the results can be improved by using bis(2,6-dimethyl-4-heptyl)-phosphoric acid as the solvent, as described in U.S. Pat. No. 3,743,696. However, it should be noted that according to the latter patent, it is necessary to heat the solution in order to completely oxidize the americium.

BRIEF SUMMARY OF THE INVENTION

The object of the present invention is a process for the separation of americium from curium which obviates the disadvantages of the processes referred to hereinbefore and which makes it possible to obtain a rapid and effective separation of the americium from the curium.

According to the invention, this object is achieved by a process wherein the initial solution undergoes oxidation at ambient temperature in the presence of phosphoric acid or phosphate ions at a concentration at the most equal to 0.1 mol per liter in such a way as to pass the americium at valency VI, the thus treated solution is brought into contact with a slightly reducing organic solvent having a high affinity for americium at valency VI in such a way as to extract the americium in the organic phase, the organic phase containing the americium at valency VI is then washed, followed by the re-extraction of the americium in the organic phase by means of an aqueous solution.

Thus, according to the process of the invention, account is taken of the fact that the separation factors between trivalent americium and trivalent curium are low and consequently the americium is passed at a different valency, namely valency VI, in such a way as to have a higher separation factor. Thus, it is known that americium exists in the acid medium in valencies III, IV, V, VI, whilst curium only has valencies III and IV.

According to another advantageous feature of the invention, the extraction, washing and re-extraction stages are performed in centrifugal extractors, the residence time of the solutions in each of the extractors being low and namely of a few dozen seconds.

The prior oxidation of the starting solution for passing americium at valency VI can be carried out by means of sodium persulphate in the presence of silver nitrate and phosphoric acid.

The organic solvent for extracting the americium from the initial aqueous solution is constituted by at least one compound chosen from the group containing the organophosphorus compounds, the amines or their mixtures diluted in an appropriate inert solvent.

The organic phase containing the americium at valency VI is washed by means of an aqueous oxidizing solution containing sodium persulphate and silver nitrate.

The americium is re-extracted from the organic phase by means of an aqueous reducing solution, such as a solution of nitrites or hydrogen peroxide.

According to another advantageous feature of the process of the invention, the prior stage during which the initial solution is oxidized in such a way as to pass the americium at valency VI is performed in the presence of a complexing compound, such as phosphoric acid or phosphate ions. Thus, in the initial aqueous solutions, the americium is at valency III.

BRIEF DESCRIPTION OF THE DRAWINGS

The attached FIG. 1 shows the influence of the presence of phosphoric acid on the oxidizing rate of the americium. FIG. 1 shows curves giving the $AM^{3+}$ concentrations as a function of time, giving an idea of the oxidation rate of the americium depending on whether said oxidation is carried out in the absence of $H_3PO_4$, in the presence of $H_3PO_4 10^{-2}$ M or the presence of $H_3PO_4 10^{-1}$ M. To this end, the process was performed at 21° C. with a solution having the following composition:

| | |
|---|---|
| $Am^{3+}$ | $9.27 \cdot 10^{-4}$M |
| $HNO_3$ | $10^{-1}$M |
| $Na_2S_2O_8$ | $10^{-1}$M |
| $AgNO_3$ | $10^{-2}$M |

Curve I represents the oxidation of this solution in the absence of phosphoric acid, curve II the oxidation of this solution in the presence of $H_3PO_4.10^{-1}$ M and curve III the oxidation of this solution in the presence of $H_3PO_4.10^{-2}$ M. These curves show the accelerating action of the phosphate ions and in fact in the presence of $H_3PO_4.10^{-1}$ M the oxidation $Am^{3+}$ into $AmO_2^{++}$ is quantitative in one hour.

DETAILED DESCRIPTION OF THE DRAWINGS AND PREFERRED EMBODIMENTS

Figure 1:
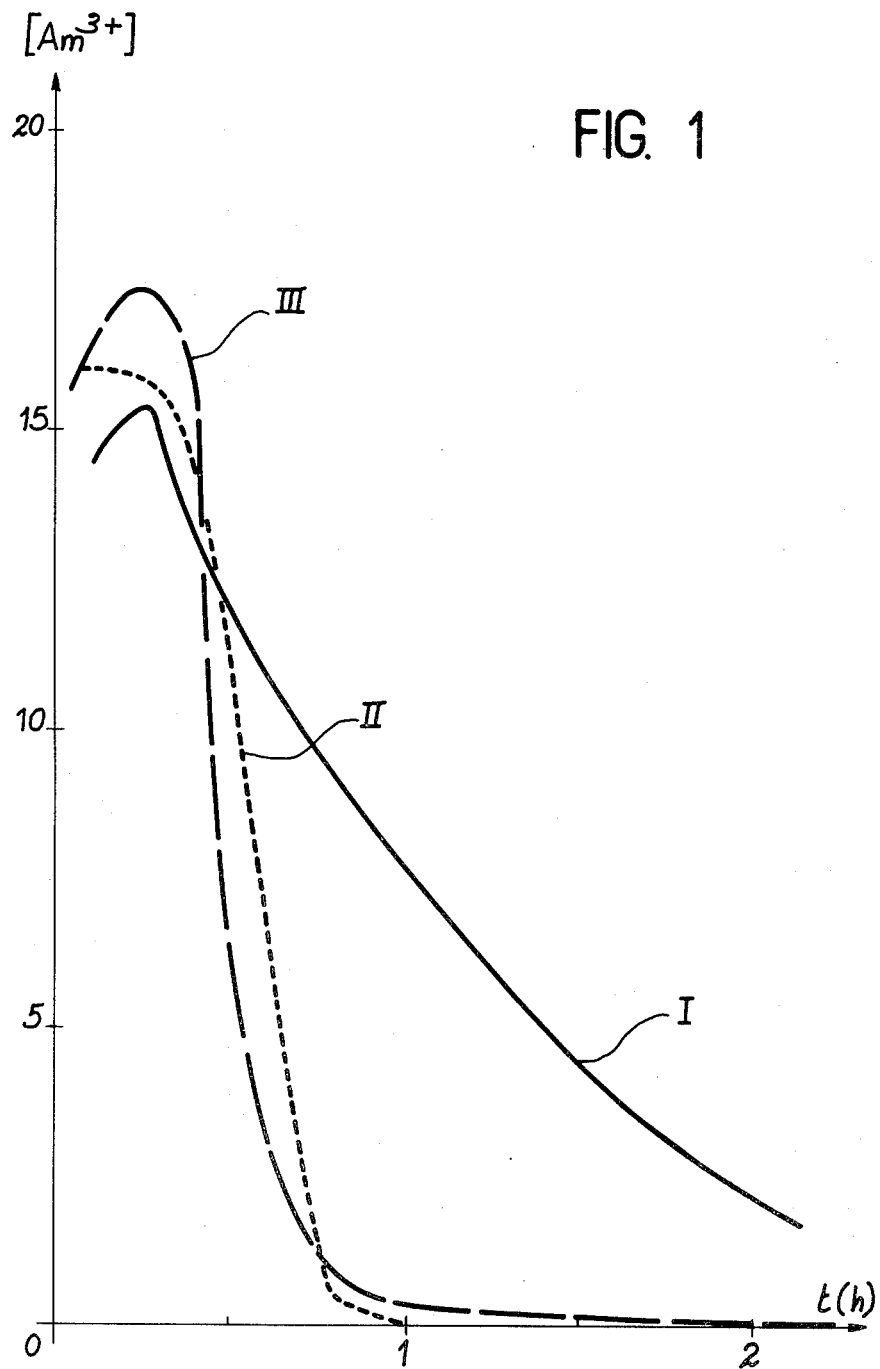
FIG. 1 is a diagram showing Americium concentration as a function of time.
Figure 2:
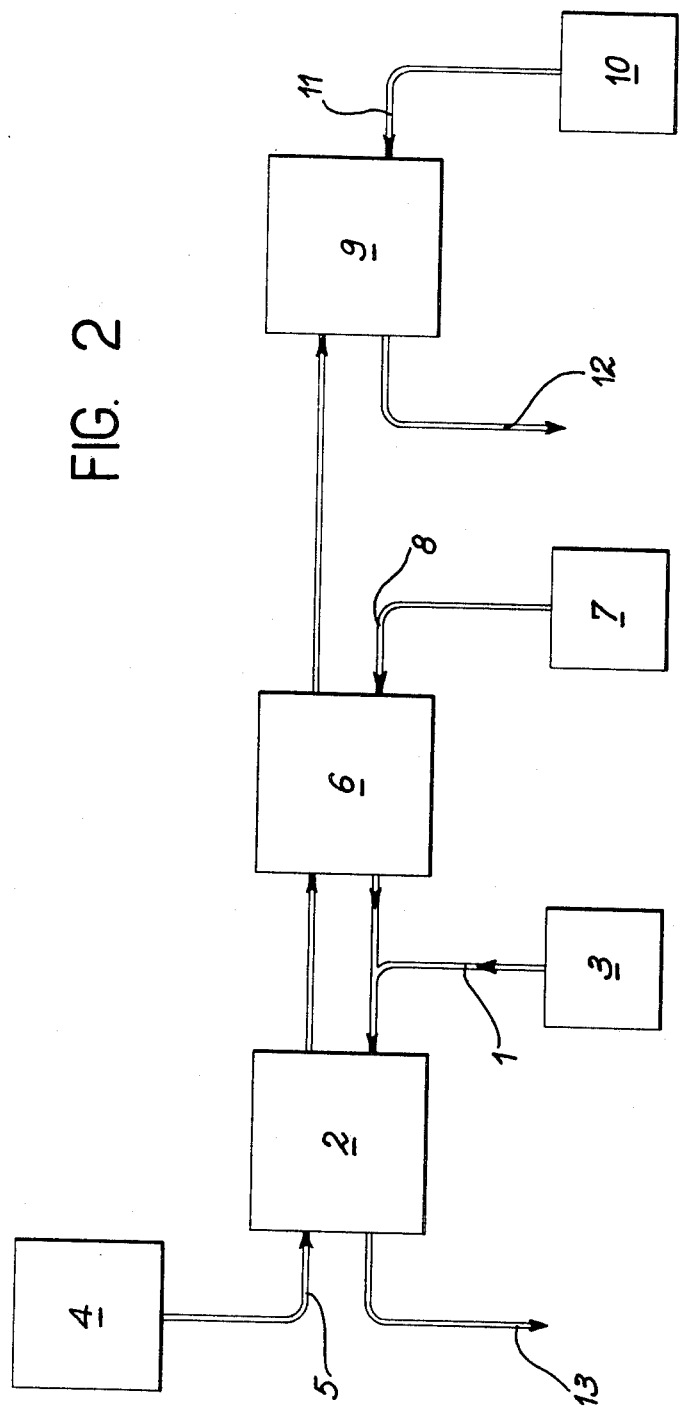
FIG. 2 diagrams the process of the invention.

The invention will be better understood from reading the following description of the performance of the process of the invention with reference to FIG. 2 which diagramatically shows the installation for performing this process.

An initial aqueous nitric solution 3 containing the americium and curium, which has previously undergone oxidation by means of a silver nitrate/sodium persulphate mixture in the presence of phosphoric acid is introduced at 1 into a centrifugal extractor 2. In extractor 2, solution 3 is in countercurrent with an organic solvent 4 introduced at 5 into said extractor 2. In extractor 2, the organic solvent becomes charged with americium and passes into the centrifugal extractor 6 where it is brought into countercurrent with a washing solution 7 introduced at 8 into extractor 6. This washing solution 7 is an oxidizing solution of nitric acid containing silver nitrate and sodium persulphate, as well as phosphoric acid. The curium which has been slightly extracted in extractor 2 passes back into the aqueous phase in extractor 6. The organic solvent charged in this way with americium then passes into centrifugal extractor 9 in which it is in countercurrent with a re-extraction solution 10 introduced at 11 into extractor 9. This re-extraction solution 10 is an aqueous reducing solution, such as a solution of nitrites or hydrogen peroxide or any other reducing agent. In extractor 9, the americium contained in the organic phase passes into the aqueous phase and is recovered at 12. A solution containing purified curium, but which still contains certain traces of valency III americium is obtained at 13 at the outlet from extractor 2. This curium undergoes a second cycle if it is required in a purer state. This second cycle consists of subjecting the solution obtained at 13 to the same stages of prior oxidation, bringing to countercurrent with a slightly reducing organic solvent and having a great affinity for valency VI americium and then to the washing and re-extraction operations.

Hereinafter and in a non-limitative manner, a number of performance examples for the present process are provided.

EXAMPLE 1

The initial aqueous solution has the following composition:

| | |
|---|---|
| $Am^{3+}$ | $4.15 \cdot 10^{-3}$M |
| $Cm^{3+}$ | $1.43 \cdot 10^{-4}$M |
| $HNO_3$ | $10^{-1}$M |

The $Na_2S_2O_8 0.1$ M, $AgNO_3 10^{-2}$ M, $H_3PO_4 10^{-2}$ M mixture is added to this solution and oxidation is allowed to take place for 15 hours at ambient temperature.

This aqueous solution previously oxidized at a flow rate of 105 ml/hour is then introduced into a centrifugal extractor where it circulates in countercurrent with an organic solvent which is constituted by trioctylphosphine oxide diluted to $3.10^{-2}$ M in an inert paraffinic diluent and which is introduced into the extractor at a flow rate of 500 ml/hour. The residence time in the extractor is 50 seconds. The americium VI-charged trioctyl phosphine oxide then passes into another centrifugal extractor where it is brought into countercurrent with a washing solution introduced at a rate of 340 ml/hour and having the following compositions:

| | |
|---|---|
| $HNO_3$ | $10^{-1}$M |
| $H_3PO_4$ | $10^{-2}$M |
| $AgNO_3$ | $10^{-2}$M |
| $Na_2S_2O_8$ | $10^{-1}$M |

In equilibrium, we obtain americium in the organic phase with a yield of 95.9% and a curium decontamination factor of 14.5 and curium in the aqueous phase with a yield of 94.2% and an americium decontamination factor of 24.

It is pointed out that the americium—curium decontamination factor is defined by dividing the americium/curium ratio in the organic solvent by the americium/curium ratio in the initial solution. In the same way, the curium—americium decontamination factor is calculated by dividing the curium/americium ratio in the aqueous solution which has undergone extraction by the curium/americium ratio in the initial solution.

EXAMPLE 2

Starting with the same aqueous solution as in Example 1, it is oxidized for 5 hours with the mixture $Na_2S_2O_8 0.1$ M, $AgNO_3 10^{-2}$ M, $H_3PO_4 10^{-2}$ M.

The thus oxidized solution is brought into countercurrent in a centrifugal extractor with an organic solvent constituted by 0.15 M di-2-ethyl-hexyl-phosphoric acid diluted in an inert paraffinic diluent. The operating conditions such as the flow rate, etc, as well as the washing operation are the same as in the first Example.

In equilibrium, americium is obtained in the organic phase with a yield of 92.4% and a curium decontamination factor of 5.3 and the curium in the aqueous phase with a yield of 99.8% and in americium a decontamination factor of 13.

EXAMPLE 3

Starting with the same aqueous solution as in Examples 1 and 2, it is oxidized for 3 hours at ambient temperature with the mixture of $Na_2S_2O_8 0.1$ M, $AgNO_3 10^{-2}$ M, $H_3PO_4 10^{-2}$ M.

The thus oxidized solution is then brought into countercurrent in a centrifugal extract with an organic solvent constituted by 0.15 M di-2-ethyl-hexyl-phosphoric acid diluted in an inert paraffinic diluent. The operating conditions such as flow rate, etc, as well as the washing operation are the same as in Example 1.

In equilibrium, americium in the organic phase is obtained with a yield of 87.7% and a curium decontamination factor of 222 and the curium in the aqueous phase with a yield of 99.6% and an americium decontamination factor of 8.

EXAMPLE 4

We start with an aqueous solution having the following composition:

| | |
|---|---|
| $Am^{3+}$ | $10^{-3}$M |
| $Cm^{3+}$ | $8 \cdot 10^{-6}$M |
| $HNO_3$ | 0.2M |

$Na_2S_2O_8$, $AgNO_3$ and $H_3PO_4$ are added to this solution in quantities such that the solution has an $Na_2S_2O_8$ concentration of 0.1 M, an $AgNO_3$ concentration of $10^{-2}$ M and an $H_3PO_4$ concentration of $3 \cdot 10^{-2}$ M. Oxidation is carried out for 2 hours at ambient temperature ($21 \pm 2°$ C.).

This previously oxidized solution is then introduced at a rate of 150 ml/h into a centrifugal extractor where it is circulated in countercurrent with an organic solvent formed by a synergic mixture of (0.015 M) tri-n-octylphosphine oxide and (0.015 M) di-2-ethyl-hexyl-phosphoric acid in a paraffinic diluent. The organic solvent is introduced into the extractor at a rate of 600 ml/h.

It is pointed out that extraction is carried out in three successive stages, each constituted by a centrifugal extractor and that the residence time of the solutions in each extractor is 40 seconds.

On leaving the final extraction stage, the americium VI-charged organic solvent passes into three washing stages where it is brought into countercurrent with a washing solution introduced at a rate of 150 ml/h and having the following composition:

| | |
|---|---|
| $HNO_3$ | 0.2M |
| $H_3PO_4$ | $3 \cdot 10^{-2}$M |
| $Na_2S_2O_8$ | $10^{-1}$M |
| $AgNO_3$ | $10^{-2}$M |

It is pointed out that each of the washing stages is constituted by a centrifugal extractor.

In equilibrium, americium is obtained in the organic phase with a yield of 87% and an americium—curium decontamination factor of 7200. The curium in the aqueous phase is obtained with a yield of 99.9% and a curium—americium decontamination factor of 7.5.

EXAMPLE 5

The same oxidized solution as in Example 4 is used, as are the three extraction stages constituted by centrifugal extractors and three washing stages also constituted by centrifugal extractors. For extraction purposes, the organic solvent used is 0.2 M di-(2,6-dimethyl-4-heptyl)-phosphoric acid in a paraffinic diluent and the same washing solution as in Example 4 is used for the washing stage.

In the extraction stages, the aqueous solution is introduced at a rate of 420 ml/h and the solvent at a rate of 1690 ml/h. The residence time of the solutions in each extractor is 35 seconds. The washing solution is introduced in the washing stages at a rate of 105 ml/h.

In equilibrium, the americium in the organic phase is obtained with a yield of 86% and a curium decontamination factor of 18750 and the curium in the aqueous phase with a yield of 99.999% and an americium decontamination factor of 7.1.

Thus, the process according to the invention makes it possible to obtain in a quasi-quantitative manner, curium-free americium, whereby the desired purity can easily be obtained by choice of the washing conditions. It is very easy to perform the process, which lends itself perfectly to the production of large quantities of americium in a continuous manner. Through the use of centrifugal extractors permitting low contact times of the different phases during the different operations makes it possible to prevent the decomposition of solvents by radiolysis, which is particularly important when curium-rich solutions are processed.

What is claimed is:

1. A process for the separation of americium from curium contained in an aqueous nitric solution comprising the steps of oxidizing the initial solution at ambient temperature by persulfate and silver ions in the presence of phosphoric acid or phosphate ions at a concentration at the most equal to 0.1 mol per liter to obtain americium (VI), then contacting the thus treated solution with an organic solvent of low reducing power having a high affinity for americium (VI) selected from the group consisting of organophosphorus compounds, amines their mixtures diluted in an inert solvent to extract the americium in the organic phase, then washing the organic phase containing the americium (VI), and finally re-extracting the americium in the organic phase by an aqueous solution.

2. A process according to claim 1, wherein the extraction, washing and re-extraction steps are carried out in centrifugal extractors, the residence times of the solutions in each of the extractors being approximately a few dozen seconds.

3. A process according to claim 1, wherein the americium of the initial solution is oxidized by sodium persulphate in the presence of silver nitrate and phosphoric acid.

4. A process according to claim 1, wherein the organic solvent is trioctyl phosphine oxide.

5. A process according to claim 1, wherein the organic solvent is di-2-ethyl-hexyl-phosphoric acid.

6. A process according to claim 1, wherein the organic solvent is a mixture of tri-n-octylphosphine oxide and di-2-ethyl-hexyl-phosphoric acid.

7. A process according to claim 1, wherein the organic solvent is di-(2,6-dimethyl-4-heptyl)-phosphoric acid.

8. A process according to claim 1, wherein the organic phase containing americium (VI) is washed by an aqueous oxidizing solution containing sodium persulphate and silver nitrate.

9. A process according to claim 1, wherein the americium is re-extracted from the organic phase by an aqueous reducing solution, such as a solution of nitrites or hydrogen peroxide.

* * * * *